(12) United States Patent
Briggs et al.

(10) Patent No.: US 12,101,525 B1
(45) Date of Patent: Sep. 24, 2024

(54) DYNAMIC OVERLAY ELEMENTS FOR A VIDEO COMMUNICATION SESSION

(71) Applicant: StreamYard, Inc., Wilmington, DE (US)

(72) Inventors: Dan Briggs, Vancouver, WA (US); Geige Vandentop, Vancouver, WA (US)

(73) Assignee: StreamYard, Inc., New York, NY (US)

( * ) Notice: Subject to any disclaimer, the term of this patent is extended or adjusted under 35 U.S.C. 154(b) by 18 days.

(21) Appl. No.: 17/734,880

(22) Filed: May 2, 2022

(51) Int. Cl.
*H04N 21/431* (2011.01)
*H04L 65/1093* (2022.01)
*H04L 65/401* (2022.01)

(52) U.S. Cl.
CPC ..... *H04N 21/4316* (2013.01); *H04L 65/1093* (2013.01); *H04L 65/4015* (2013.01)

(58) Field of Classification Search
None
See application file for complete search history.

(56) References Cited

U.S. PATENT DOCUMENTS

| | | | |
|---|---|---|---|
| 2008/0136898 A1* | 6/2008 | Eisenberg | H04N 7/152 348/E7.083 |
| 2011/0078747 A1* | 3/2011 | Chung | H04N 21/4318 463/30 |
| 2019/0213768 A1* | 7/2019 | Rastogi | H04N 21/4316 |

* cited by examiner

*Primary Examiner* — Samira Monshi
(74) *Attorney, Agent, or Firm* — Erise IP, P.A.

(57) ABSTRACT

Systems, methods, and computer-readable media are provided for dynamic video rendering in which a dynamic overlay is rendered over a video stream during a video communication session. The dynamic overlay is configured to be updated based on video stream changes experienced during the video communication session such that the dynamic overlay is adjusted in real-time based on updated parameters of the corresponding video stream.

20 Claims, 10 Drawing Sheets

DYNAMIC OVERLAY ELEMENTS FOR A VIDEO COMMUNICATION SESSION

TECHNICAL FIELD

Embodiments of the invention relate to video communication sessions. More specifically, embodiments of the invention relate to automatically updating video overlay elements during video communication sessions.

In many cases, video overlays containing related information are static and are applied to video recordings during post processing. Additionally, overlays may be utilized for live video streams. However, said overlays fail to adapt to various changes with respect to the live video streams. For example, if a size or positioning of the video stream changes, the overlay is not equipped to account for the updated size, aspect ratio, and positioning. As such, said live video streams may be restricted to static size aspect ratio, and positioning such that the video streams cannot be dynamically altered in an attempt to avoid overlay issues such as incorrect positioning and size.

SUMMARY

Embodiments of the invention solve the above-mentioned problems by providing systems, methods, and computer-readable media for dynamic video rendering in which dynamically rendered overlays automatically adapt to video stream changes in real-time during a video communication session.

In some aspects, the techniques described herein relate to one or more non-transitory computer-readable media storing computer executable instructions that, when executed by at least one processor, perform a method for dynamic video rendering, the method including receiving a selection of an overlay template from a plurality of overlay templates, retrieving the overlay template from an overlay template repository, the overlay template including hypertext markup language (HTML) code for generating a substantially transparent dynamic overlay including one or more non-transparent dynamic overlay elements, rendering a plurality of video streams using a simulated browser during a video communication session, rendering the dynamic overlay over a video stream of the plurality of video streams using the simulated browser during the video communication session, responsive to a change in at least one of the plurality of video streams during the video communication session, automatically reflowing the dynamic overlay based on an updated scale and position of the video stream, and storing a composite video recording including the plurality of video streams and the dynamic overlay.

In some aspects, the techniques described herein relate to a computer-readable media, wherein the change in the at least one of the plurality of video streams includes changing an aspect ratio of the video stream.

In some aspects, the techniques described herein relate to a computer-readable media, wherein the change in the at least one of the plurality of video streams is associated with a user joining or leaving the video communication session.

In some aspects, the techniques described herein relate to a computer-readable media, wherein the change is associated with a user selection from a user within the video communication session.

In some aspects, the techniques described herein relate to a computer-readable media, wherein the one or more dynamic overlay elements includes at least one of an adaptive name tag, a live comment, custom text, or integration output display.

In some aspects, the techniques described herein relate to a computer-readable media, further including generating one or more hypertext markup language (HTML) custom overlay templates based on one or more user selections.

In some aspects, the techniques described herein relate to a computer-readable media, further including receiving an additional selection of an additional overlay template from the plurality of overlay templates, retrieving the additional overlay template from the overlay template repository, the additional overlay template including hypertext markup language (HTML) for generating an additional substantially transparent dynamic overlay including one or more non-transparent dynamic overlay elements, rendering the dynamic overlay over an additional video stream of the plurality of video streams using the simulated browser during the video communication session, and responsive to the change in at least one of the plurality of video streams, automatically reflowing the additional dynamic overlay based on an updated scale and position of the additional video stream.

In some aspects, the techniques described herein relate to a method for dynamic video rendering, the method including receiving a selection of an overlay template from a plurality of overlay templates, retrieving the overlay template from an overlay template repository, the overlay template including hypertext markup language (HTML) code for generating a substantially transparent dynamic overlay including one or more non-transparent dynamic overlay elements, rendering a plurality of video streams using a simulated browser during a video communication session, rendering the dynamic overlay over a video stream of the plurality of video streams using the simulated browser during the video communication session, and responsive to a change in at least one of the plurality of video streams during the video communication session, automatically reflowing the dynamic overlay based on an updated scale and position of the video stream.

In some aspects, the techniques described herein relate to a method, further including storing a composite video recording including the plurality of video streams and the dynamic overlay.

In some aspects, the techniques described herein relate to a method, further including receiving one or more user selections within a builder tool user interface, wherein the builder tool user interface allows a limited subset of operations for custom creating overlay templates while restricting one or more other operations, and generating a custom user-defined overlay template file in a native file format based on the one or more user selections.

In some aspects, the techniques described herein relate to a method, further including converting the custom user-defined overlay template file from the native file format into an HTML format to produce a custom user-defined overlay template, and storing the custom user-defined overlay template in the overlay template repository.

In some aspects, the techniques described herein relate to a method, wherein the one or more dynamic overlay elements include a plurality of animated images to be displayed over the video stream during the video communication session.

In some aspects, the techniques described herein relate to a method, further including responsive to a subsequent change in at least one of the plurality of video streams during the video communication session, automatically reflowing the dynamic overlay based on a subsequent updated scale and position of the video stream.

In some aspects, the techniques described herein relate to a method, wherein the subsequent change in the at least one of the plurality of video streams is associated with a user joining or leaving the video communication session.

In some aspects, the techniques described herein relate to a system for dynamic video rendering including at least one data store, and at least one processor programmed to perform a method including receiving a selection of an overlay template from a plurality of overlay templates, retrieving the overlay template from an overlay template repository, the overlay template including hypertext markup language (HTML) code for generating a substantially transparent dynamic overlay including one or more non-transparent dynamic overlay elements, rendering a plurality of video streams using a simulated browser during a video communication session, rendering a first dynamic overlay over a first video stream of the plurality of video streams corresponding to a first user using the simulated browser during the video communication session, rendering a second dynamic overlay over a second video stream of the plurality of video streams corresponding to a second user using the simulated browser during the video communication session, and responsive to a change in at least one of the plurality of video streams during the video communication session automatically reflowing the first dynamic overlay based on an updated scale and position of the first video stream, and automatically reflowing the second dynamic overlay based on an updated scale and position of the second video stream.

In some aspects, the techniques described herein relate to a system, further including responsive to a subsequent change in at least one of the plurality of video streams during the video communication session automatically reflowing the first dynamic overlay based on a subsequent updated scale and position of the first video stream, and automatically reflowing the second dynamic overlay based on a subsequent updated scale and position of the second video stream.

In some aspects, the techniques described herein relate to a system, wherein the one or more dynamic overlay elements include a dynamic value configured to update during the video communication session.

In some aspects, the techniques described herein relate to a system, wherein the change in the at least one of the plurality of video streams is associated with a share screen operation by the first user, further including increasing a scale of the first video stream based on the share screen operation, wherein automatically reflowing the first dynamic overlay includes updating the overlay based at least in part on the share screen operation.

In some aspects, the techniques described herein relate to a system, further including suppressing display of the second video stream and the second dynamic overlay during the video communication session based on the share screen operation.

In some aspects, the techniques described herein relate to a system, wherein the one or more dynamic overlay elements include a dynamic name tag, further including updating a format of a first dynamic name tag including a username of the first user rendered over the first video stream based on the at least one change in at least one of the plurality of video streams, and updating a format of a second dynamic name tag including a username of the second user rendered over the second video stream based on the at least one change in at least one of the plurality of video streams.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
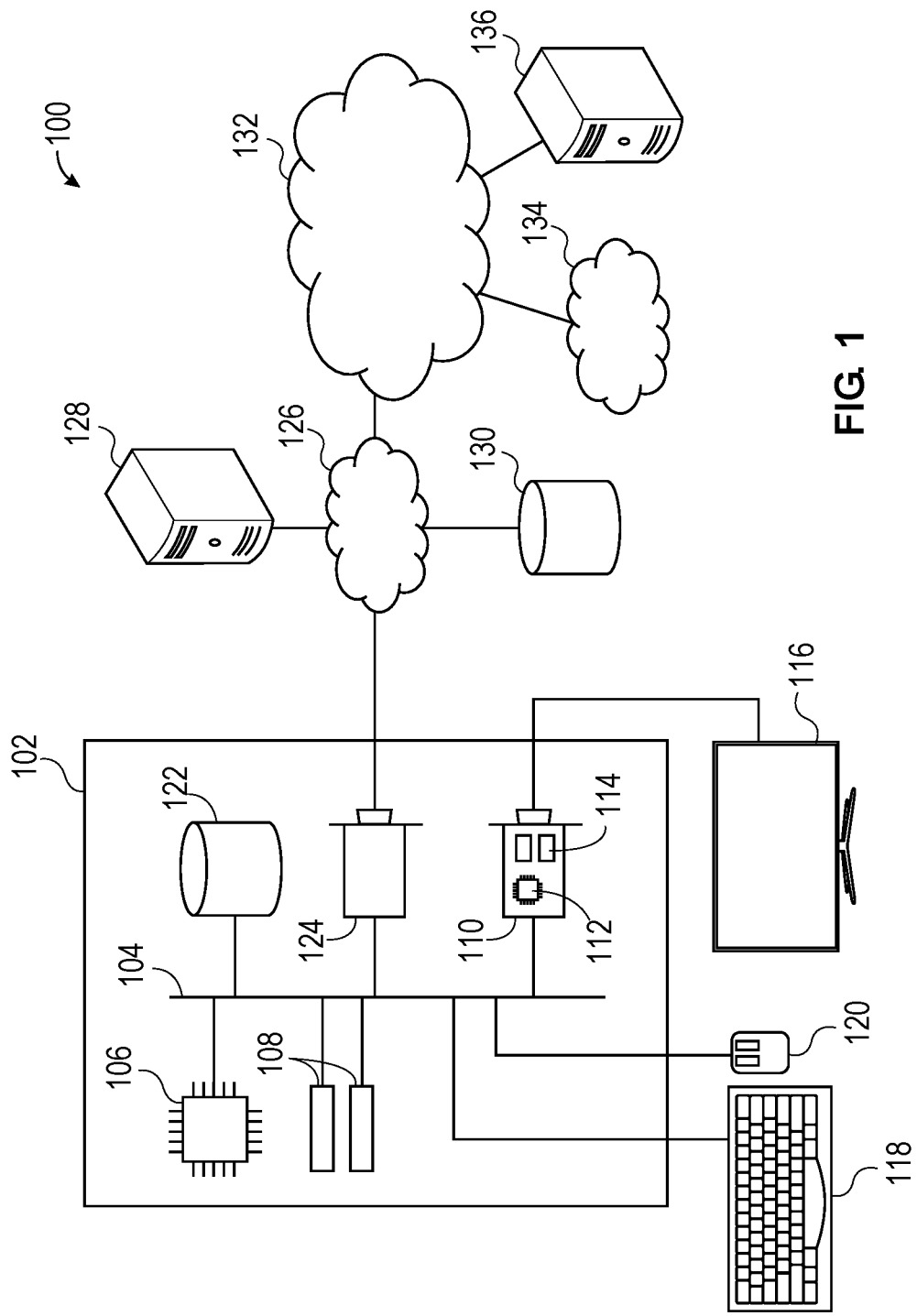
FIG. 1 depicts an exemplary hardware platform relating to certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1, an exemplary hardware platform 100 for certain embodiments of the invention is depicted.

Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Such non-transitory computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2A:
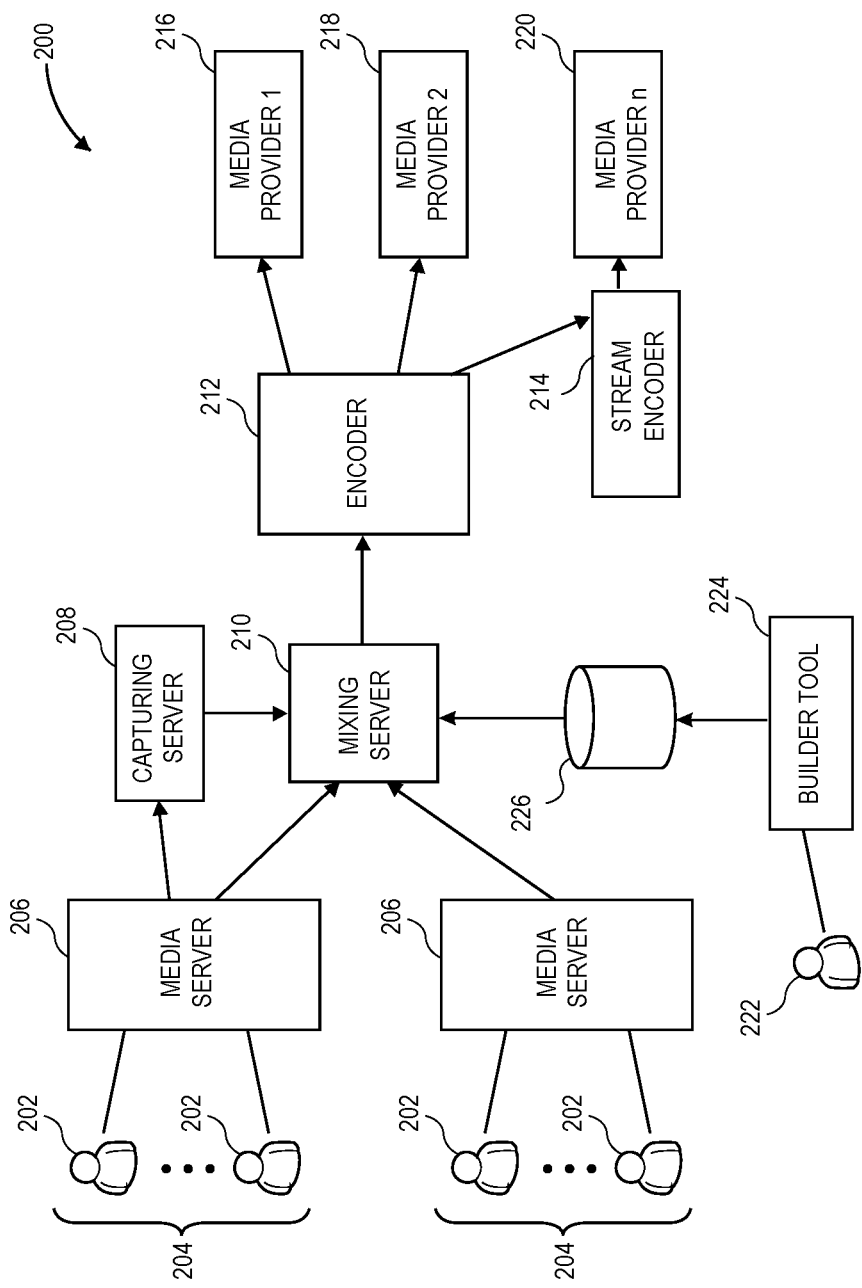
FIG. 2A illustrates elements of a system for carrying out embodiments of the invention.

FIG. 2A illustrates elements of a system 200 for carrying out embodiments of the invention. In some embodiments, users 202 are grouped into studios 204 for connecting to a single media server 206. In these embodiments, associating a group of users 202 in a particular studio 204 with a single media server 206 has the benefit of eliminating a need for multiple media servers 206 to perform inter-server communication. In these embodiments, a number of users 202 in a particular studio 204 is small enough (on the order of ten or so) that a single instance of a media server 206 is adequate to receive from and transmit various video streams associated with studio 204.

In some embodiments, users 202 may use devices with low computational power to record a single stream of video and stream that video to media server 206. In some embodiments, where users 202 are on a relatively low-bandwidth connection, a lossy compression may be employed so that a particular video stream is able to keep up within the constraints of the low-bandwidth connection. In some such embodiments, where lossy compression is employed for the live stream, a lossless version of the recording is persisted locally, for example, on a storage medium associated with a client device of user 202 that has only a low-bandwidth connection. In such embodiments, once the live streaming has concluded, or in the case where a high-bandwidth connection is encountered, the lossless recording of the recorded video is uploaded to media server 206 and subsequently forwarded on to capturing server 208. In some embodiments, the lossless recording of the recorded video is transmitted directly to capturing server 208. In alternative embodiments, where user 202 has a high-bandwidth connection, the lossless recording may be streamed substantially simultaneously with the compressed stream that is used to render a composite video stream.

In some embodiments, the video streams may be mixed and rendered on a web page by a simulated browser in connection with the mixing server. Embodiments are contemplated in which a first communication protocol is used for receiving individual video streams from the plurality of participant users and a second communication protocol distinct from the first is used for providing the mixed video stream to a multitude of live stream viewing users, which may optionally receive live streaming video from one or more media providers.

As further described in connection with FIG. 2A below, in some embodiments, mixing server 210 receives multiple streams and other multimedia assets and descriptors to render a composite video stream. In some such embodiments, mixing server 210 renders the composite video in connection with a simulated-display browser rendering engine running on mixing server 210. A simulated-display browser rendering engine operates like a web browser in that it renders a web page based on a rendering template such as, for example, Hypertext Markup Language (HTML) or other web-based markup in order to render various components of a mixed set of video streams, generating a single stream from the individual streams and any associated text and graphics. In some embodiments, the simulated display browser may be referred to as a headless browser. The simulated display browser, however, is not necessarily connected to a physical display. Instead (or in addition), the visual components of the associated simulated display may be mapped to a storage location or memory associated with mixing server 210 in such a way that the simulated display can nevertheless be subject to a simulated screen capture process, whereby a single video stream video of the simulated display is captured and persisted to a shared memory associated with mixing server 210. In some embodiments, the shared memory may be an operating-system-based file system that implements concurrency controls so that multiple processes may read from the composite video stream while mixing server 210 continually adds contents to the video stream.

Mixing server 210 may be a dedicated server, a shared server, a virtual machine instance in a cloud computing environment, or any other form of computing device discussed above with respect to FIG. 1. Mixing server 210 may also be implemented in connection with containers (e.g., DOCKER-style containers) as provided by platform-as-a-service (PaaS) technologies with virtualized host operating systems or with any number of serverless PaaS technologies.

Although a single mixing server 210 is depicted, embodiments with multiple such services are also contemplated to provide scale, redundancy and/or isolation between different instances of a composite video live streaming platform. For example, a live stream organizer hosting a private live stream in which viewers register under a non-disclosure agreement may not wish to have the confidential live stream hosted on the same system as another live stream organizer's live stream, for security reasons. Moreover, a live stream with a large number of participants or potential guests may require multiple instances of mixing server 210 for scaling purposes to provide sufficiently performant interactive response times that are adequate to provide an acceptable user experience.

In some embodiments, once the simulated browser rendering engine associated with mixing server 210 has rendered composite video frames and the rendered composite video frames have been captured and persisted to a shared memory associated with mixing server 210, the captured frames may be encoded in connection with encoder 212 into an encoded format that is compatible with various media providers such as media provider 216, media provider 218, and media provider 220. These various media providers may correspond to any type of social media platform that facilitates live streaming. In some embodiments, encoder 212 may be implemented in connection with a video encoding process that receives a stream of frames and produces an encoded video stream. For example, one such video encoding process, FFmpeg, provides a suite of libraries and programs for processing multimedia files and streams. In some alternative embodiments, after encoder 212 encodes the captured frames, a subsequent video stream encoding process 214 carries out post-processing encoding to, for example, encode additional information or change a video format or associated compression scheme associated with the composite video stream being provided to media provider 220.

In some embodiments, a builder user 222 operates a builder tool 224 to create one or more custom user-defined overlay templates. In some embodiments, the custom user-defined overlay templates may be stored within an overlay template repository 226, as shown, or other data store storing overlay templates. In some embodiments, the overlay template repository 226 may be communicatively coupled to the mixing server 210 such that one or more predefined overlay templates may be selected for a video communication session. Accordingly, dynamic overlays may be rendered over one or more video streams based on the selected overlay template. In some embodiments, the overlay template may be selected from one or more preconfigured overlay templates and one or more custom user-defined overlay templates stored on the overlay template repository 226.

Figure 2B:
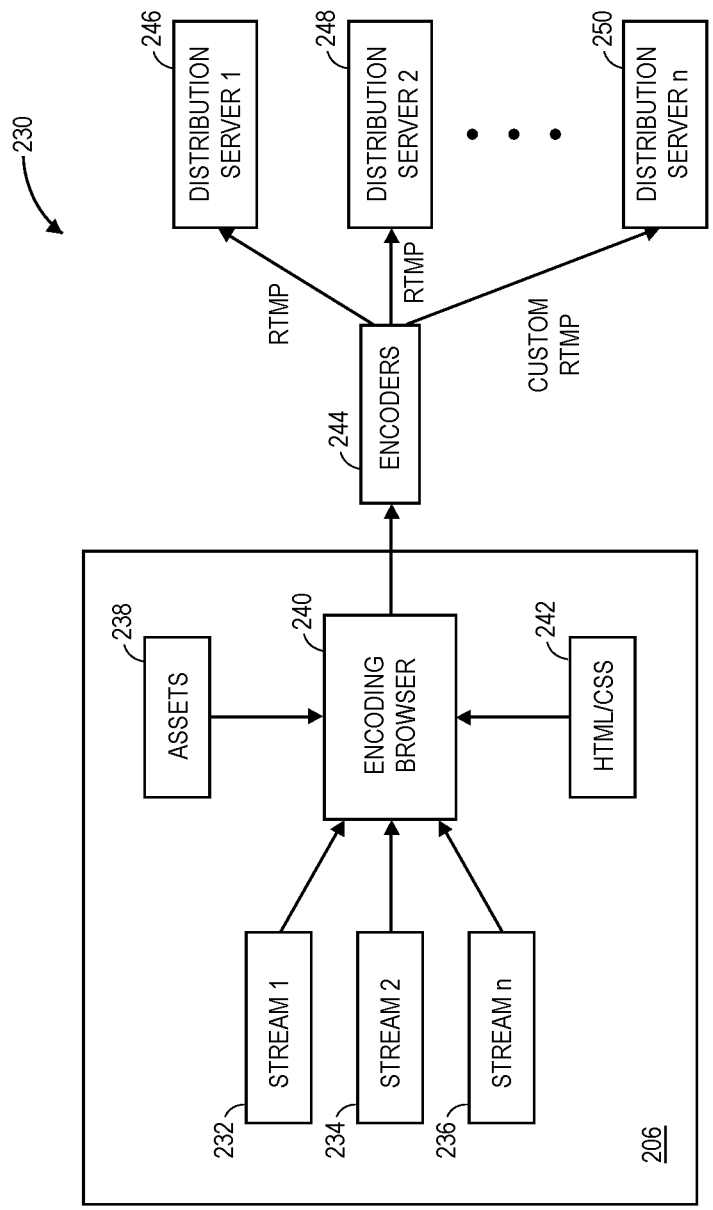
FIG. 2B illustrates elements of a system for carrying out embodiments of the invention.

FIG. 2B illustrates elements of a system 230 for carrying out alternative embodiments of the invention. System 230 depicts an expanded view of media server 206 in which media server 206 takes on the roles of media server as well as mixing server 210 and capturing server 208 for ease of description. In these embodiments, multiple streams such as stream 232, stream 234, and stream 236 are received into media server 206 and processed in connection with encoding browser 240. In some embodiments, encoding browser 240 is a simulated display browser that relies on a web browser rendering engine to render a simulated web page, which rendered page is not necessarily sent to a physical display but merely rendered in a memory that could be forwarded to a physical display but could also be further processed and/or captured. In some embodiments, encoding browser 240 employs a modified version of a browser rendering engine, such as CHROMIUM, that renders its display to a virtual display server such as a graphical windowing display server. It is an advantage of such an approach that the existing layout and video decoding capabilities of encoding browser 240 can be utilized rather than writing a custom video decoder/layout/rendering engine for each layout of video that might be used in the video event hosting service. In some such embodiments, a network-capable sound server is employed to process an audio stream associated with the audiovisual streams received by encoding browser 240. In other embodiments, a voice chat mixing service such as OPENTALK is used to process the audio streams for communication among the participants as well as the audio portion of the combined video stream.

In some embodiments, a browser window layout as rendered and captured in connection with encoding browser 240 is formatted in connection with HTML and/or CSS from formatting source 242. Additionally, or in the alternative, assets 238 are provided to encoding browser 240 so that encoding browser 240 may render various graphical assets in connection with the rendered composite video stream such that assets 238 may represent backgrounds, logos, and/or other graphics to augment the composite video stream and provide a consistent branding experience, etc.

In some embodiments, the output from encoding browser 240 is provided to subsequent downstream encoders 244. As described above in connection with FIG. 2A, such encoders may provide an output in a real-time messaging protocol (RTMP) format as needed by social media platforms or other distribution servers such as distribution server 246, distribution server 248, or distribution server 250. As shown in FIG. 2B distribution server 246 receives a live stream according to an RTMP protocol corresponding to distribution server 246 and distribution server 248, which may be, for example YOUTUBE. Also illustrated is a custom RTMP protocol for sending a live stream to distribution server 250, which may receive an arbitrary RTMP live stream for distributing to other users.

Figure 3A:
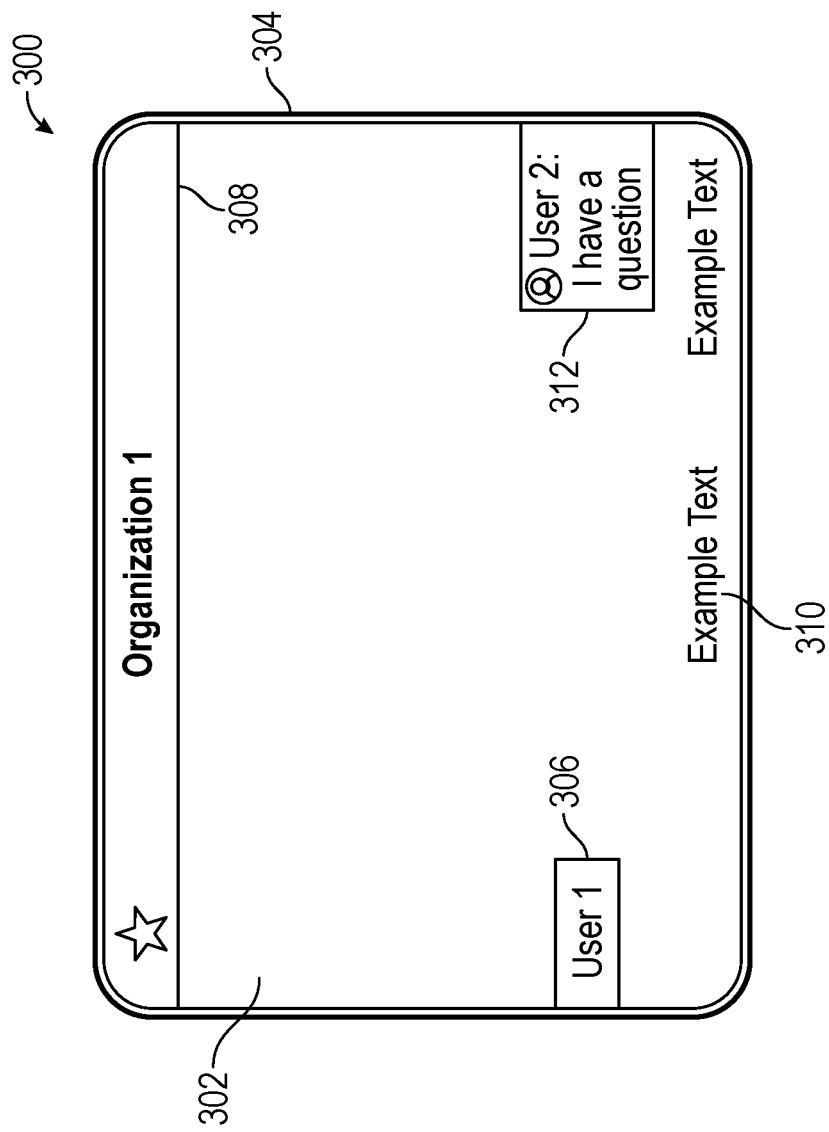
FIG. 3A depicts an exemplary overlay relating to some embodiments of the invention.

Turning now to FIG. 3A, an exemplary overlay 300 is depicted relating to some embodiments of the invention. In some such embodiments, the overlay 300 may be configured to be rendered and displayed over a video stream window during a video communication session between a plurality of meeting participants such as, for example, users 202, as shown in FIG. 2A. In some embodiments, the overlay 300 comprises a transparent portion 302, as shown, along with one or more non-transparent dynamic overlay elements. As used herein, the term "dynamic" refers to an element that is dynamically reflowable rather than animated, although (as discussed below) dynamic elements may additionally be animated. In some embodiments, the one or more dynamic overlay elements includes any combination of a border 304, a name tag 306, a banner 308, a ticker 310, one or more user comments 312, as well as other types of dynamic overlay elements not explicitly described herein.

In some embodiments, at least one of the dynamic overlay elements may comprise animated images configured to be displayed over a corresponding video stream during a video communication session. For example, in some embodiments, the name tag 306 may comprise an animated image of the user's name or even an animated image of the user. Further, in some embodiments, the banner 308 may include an animation of the organization name or an animated logo. Further still, additional dynamic overlay elements may be included which comprise animated images which are configured to be rendered over a corresponding video stream.

In some embodiments, the border 304 may be configured to match the size, aspect ratio, and positioning of a corresponding video stream window along the outer perimeter of the video stream window. Accordingly, the transparent portion 302 allows the corresponding video stream to remain visible behind the overlay 300, as will be described in further detail below. In some embodiments, the dynamic overlay elements are non-transparent meaning they may be opaque or are at least not fully transparent. For example, in some embodiments, a first dynamic overlay element may be opaque while a second dynamic overlay element is partially transparent but is still visible over the video stream. In some embodiments, the name tag 306 is configured to display a username of a user associated with the corresponding video stream. Accordingly, in some embodiments, the name tag 306 is adaptive and is automatically updated with respect to the username such that the username of each individual user is displayed over their respective video stream and if the username is changed, the name tag 306 will be automatically updated to reflect the new username.

In some embodiments, the banner 308 comprises a string of text to be rendered over the video stream window. For example, in some embodiments, the banner 308 may include an organization name with which the user and video stream is associated, as shown. In some embodiments, the banner 308 may include additional imagery and branding. For example, the banner 308 may include a company name and associated logo or slogan. In some embodiments, the ticker 310 may include a string of scrolling text configured to move along the bottom of the video stream window. In some embodiments, the ticker 310 may include an alert or phrase which is repeatedly displayed within the overlay 300 and, in some embodiments, may be updated, changed, or removed during the video communication session. It should be understood that the ticker 310 is not limited to be displayed at the bottom of the video stream window, as shown. For example, in some embodiments, the ticker 310 may be displayed at a top portion of the overlay 300 or in the center.

In some embodiments, the overlay 300 further comprises one or more user comments 312. In some embodiments, the one or more user comments 312 may comprise comments posted by participant or viewer users during the video communication session. For example, in some such embodiments, a meeting participant user may select another user's video stream and post a user comment comprising a string of text, which is then rendered over the video stream as part of the overlay 300. Further, embodiments are contemplated in which a link may be provided within the user comment 312 such that the link is displayed over the video stream and accessible to meeting participants and viewers. For example, if a specific web resource is referenced during the video communication session, users may add the link to a video stream via the user comment functionality. Further still, embodiments are contemplated in which users may add user comments 312 to their own video streams.

Figure 3B:
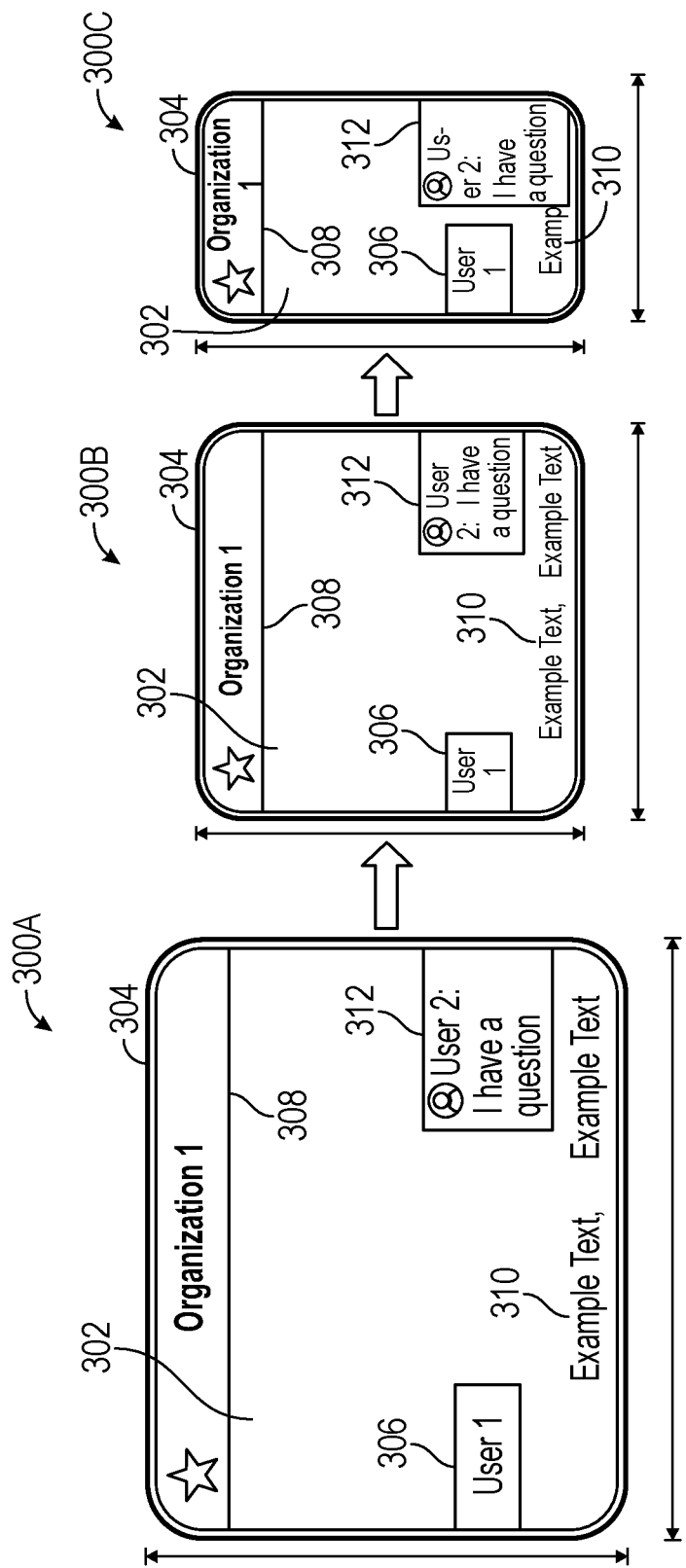
FIG. 3B depicts multiple forms of an exemplary overlay relating to some embodiments of the invention.

Turning now to FIG. 3B, an initial overlay 300A, an altered overlay 300B, and a further altered overlay 300C are depicted relating to some embodiments of the invention. In some embodiments, the initial overlay 300A, the altered overlay 300B, and the further altered overlay 300C may include the transparent portion 302 and one or more of the dynamic overlay elements such as, the border 304, the name tag 306, the banner 308, the ticker 310, and the one or more user comments 312. However, as the overlay 300 is altered in size, positioning, or aspect ratio, the dynamic overlay elements may be automatically reflowed or otherwise adjusted. In some embodiments, the overlay 300 may be altered based at least in part on a video stream window associated with the overlay 300, as will be described in further detail below.

In some embodiments, the initial overlay 300A comprises a larger size than the altered overlay 300B and the further altered overlay 300C, as shown. For example, the initial overlay 300A may be an expanded form of the overlay 300 while the altered overlay 300B is a compressed form of the overlay 300 and the further altered overlay 300C is a further compressed form of the overlay 300 with an adjusted aspect ratio. Here, the initial overlay 300A and the altered overlay 300B may have a similar aspect ratio but a different size while the further altered overlay 300C has a different aspect ratio and appears horizontally thinned.

In some embodiments, the dynamic overlay elements may be adjusted along with the overlay 300. For example, when the size of the overlay 300 is reduced from the initial overlay 300A to the altered overlay 300B the wrapping of the text strings within the dynamic overlay elements may be adjusted. For example, the text string within the name tag 306 may be wrapped to appear on two lines rather than one. Accordingly, in some embodiments, the text size may remain the same such that the text remains readable while the text wrapping changes. Further, in some embodiments, the text size may be reduced down to a reasonable size threshold such that the text remains visible and readable. Beyond said threshold, the text within the dynamic overlay elements may begin to wrap. For example, the name tag 306 may include a string "User1", as shown, which is rendered on a single line in the initial overlay 300A but is rendered over two separate lines on the altered overlay 300B with text wrapping because of the reduced size of the overlay 300.

Figure 4A:
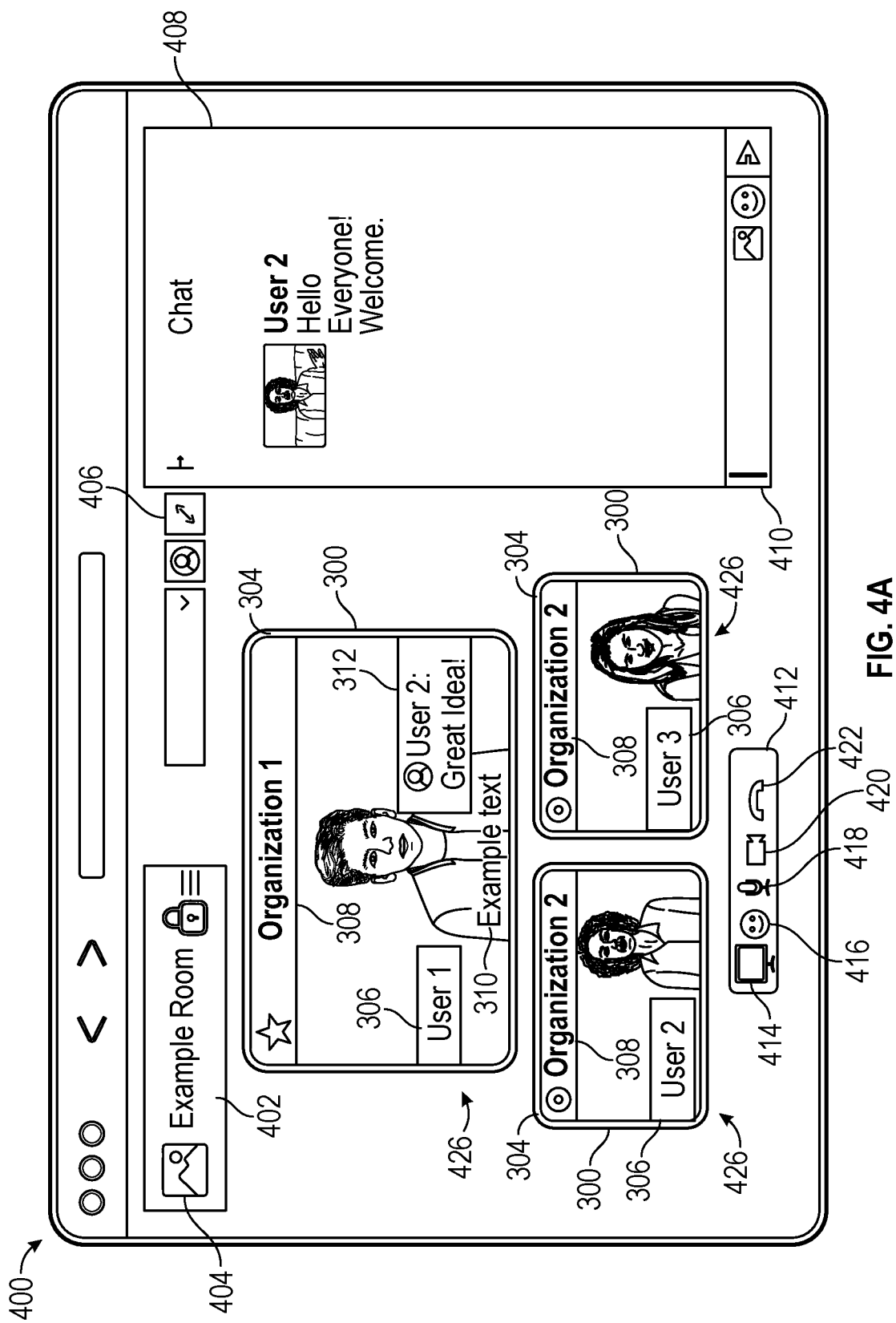
FIGS. 4A-4C depict an exemplary user interface relating to some embodiments of the invention.

Turning now to FIG. 4A, an exemplary user interface 400 is depicted relating to some embodiments of the invention. In some embodiments, the user interface 400 may be displayed on one or more user devices during a video communication session. In some such embodiments, the user interface 400 comprises a title indicator 402 which may indicate a title associated with the currently active video communication session. Further, in some embodiments, the title indicator 402 may be displayed along with additional display objects such as, for example, a video communication session icon 404, which may be an image associated with the video communication session, a private indicator, which may indicate whether the video communication session is private or public, as well as additional display objects not explicitly described herein. In some embodiments, the video communication session icon 404 may comprise a branding image such as logo of an organization which is hosting the video communication session.

Additionally, the user interface 400 further includes a link actuator 406, which in some embodiments, may be selected to generate a link associated with the video communication session. For example, in some embodiments, a user may select the link actuator 406 to copy a hyperlink which may be shared with other users to allow said other users to access the video communication session. Further, in some embodiments, selecting the link actuator 406 prompts the user to share a link to the communication session to other users via a number of communication means such as email or text, as well as various social media platforms.

Further still, the user interface 400 may include a chat window 408 which may be used to display a chat associated with the video communication session. For example, the chat window 408 may provide a text-based communication environment for participants and viewers of the video communication session. However, in some embodiments, it should be understood that the chat window 408 may allow alternative forms of communication besides text messages such as messages including, emojis, images, audio, and other types of files. In some embodiments, the chat window 408 includes a message composer 410 which may be used to compose and send a message including any combination of text, emojis, images, and audio, within the chat window 408.

In some embodiments, a set of video meeting controls 412 may be included within the user interface 400. In some such embodiments, the set of video meeting controls 412 may include any combination of a share screen actuator 414, an emoji actuator 416, a microphone actuator 418, a camera actuator, and a leave session actuator 422, as shown. The share screen actuator 414 may be selected by a user to share said user's screen with other users within the video communication session. The emoji actuator 416 may be used to submit emojis within the video communication session. For example, a user may select the emoji actuator 416 to generate a list of emojis which may then be shared and displayed within the user interface 400 to a plurality of users in the video communication session for a predetermined period of time. The microphone actuator 418 may be selected to modify the output of a user's microphone within the video communication session. For example, a user may select the microphone actuator 418 to mute or unmute their microphone. Similarly, the camera actuator 420 may be selected to enable/disable the user's camera. The leave session actuator 422 may be selected by a user to leave or close out of the video communication session.

In some embodiments, the user interface 400 further comprises one or more video stream windows 426, as shown, each corresponding to a respective participant user of the video communication session. In some embodiments, an overlay 300 may be rendered over each video stream window 426, as shown. In some embodiments, the video stream window 426 is rendered on a first layer of the user interface 400 while the overlay 300 is rendered on a second layer such that the overlay 300 appears in front of the video stream. In some such embodiments, the overlays 300 may include any of the non-transparent elements described above, as well as the transparent portion 302 such that at least a portion of the video stream window 426 is still visible. In some embodiments, the non-transparent dynamic overlay elements are rendered in front of the video stream window 426, as shown.

In some embodiments, only a portion of the non-transparent dynamic overlay elements described above are included within some of the overlays 300. For example, a first overlay may comprise the border 304, the name tag 306, the banner 308, the ticker 310, and the user comment 312, while a second overlay comprises only the name tag 306 and banner 308, as shown. Further still, in some embodiments, overlays 300 may include different elements not explicitly described herein.

In one example, a group of users may be joined within a video communication session, such as three users, as shown. Accordingly, the video stream windows 426 are rendered for each user on the user interface 400 with an overlay 300 rendered over each of said video stream windows 426. In some embodiments, the size, scaling, and positioning of the overlays 300 is determined based on a size, scaling, and positioning of each respective video stream window 426. Accordingly, a larger video stream window will have a larger overlay. Further, in some embodiments, if the video stream windows are altered during the video meeting session, such as, for example, by repositioning the video stream windows or altering the size, scaling, or aspect ratio, the corresponding overlay may be automatically reflowed or otherwise updated to match the video stream window, as will be described in further detail below. For example, a user may expand the video stream windows 426 by collapsing the chat window 408. Accordingly, the chat window 408 will be collapsed and more space will be available to render the video stream windows 426. Here, each of the video stream windows may be automatically repositioned and enlarged to utilize the available space. Similarly, the overlay 300 for each video stream window 426 will be automatically updated based on this change to fit the adjusted video stream windows 426. In some embodiments, a similar process will be carried out for various other scenarios in which the video stream windows are adjusted. For example, if a user expands or collapses a window associated with the user interface 400, a new user joins the video communication session, a user leaves the video communication session, or a user manually adjusts the size and/or positioning of one or more video stream windows 426, the corresponding overlays or overlays may be reflowed or otherwise updated.

Figure 4B:
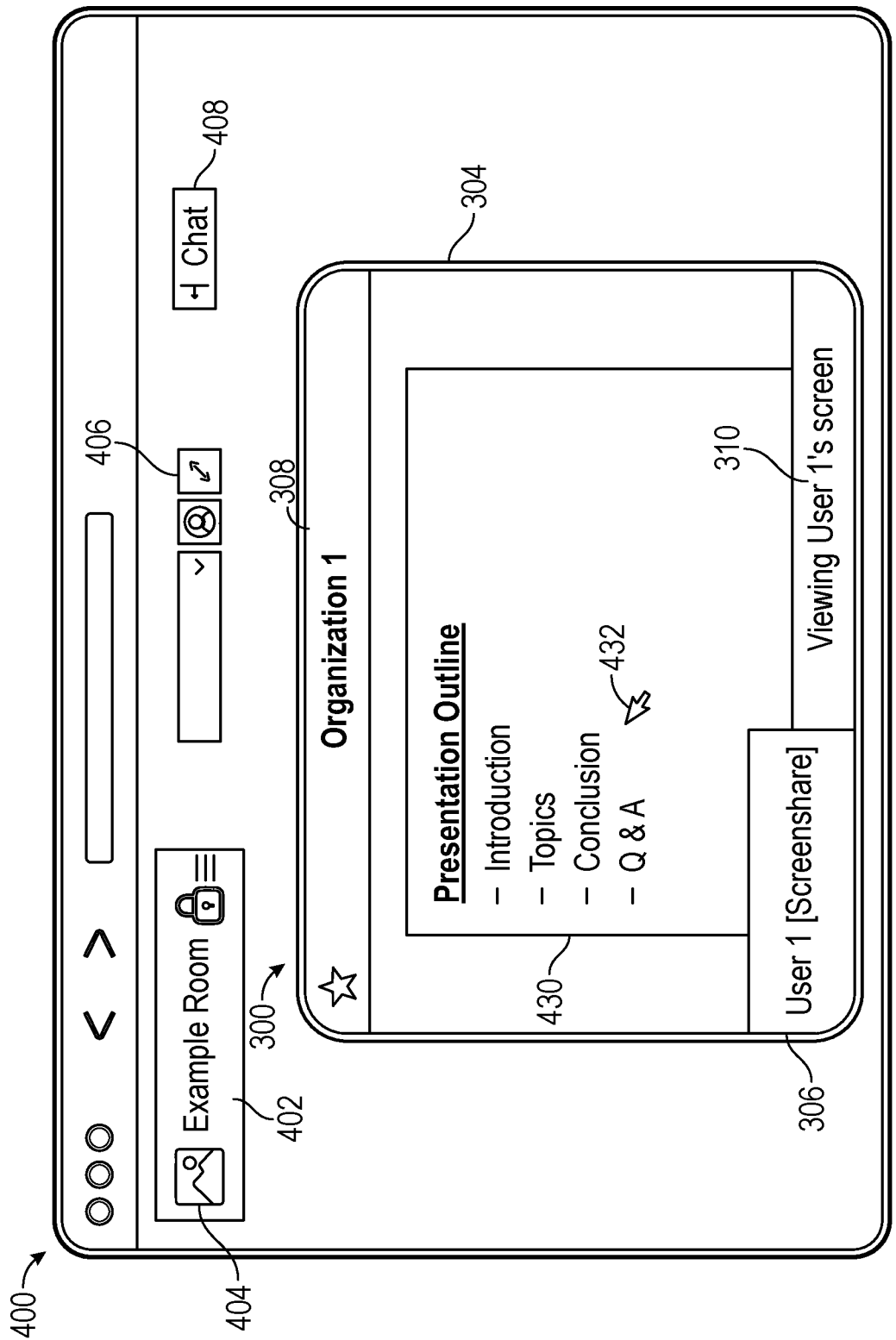

Turning now to FIG. 4B, the user interface 400 is depicted relating to some embodiments of the invention. In some such embodiments, various actions and features may be utilized during the video communication session. For example, a first user may elect to share their screen during the video communication session. Accordingly, the first user's screen will be displayed within a share screen video stream window 430, as shown. In some embodiments, the remaining video stream windows 426 of other users may be suppressed or are at least reduced in size to enhance the visibility of the first user's video stream, which is increased in size. Accordingly, the overlay 300 of the first user's video stream may be automatically reflowed or otherwise updated to match the adjusted share screen video stream window 430.

In some embodiments, the chat window 408 may be collapsed, as shown and described above, leaving more space available for the share screen video stream window 430. In some embodiments, in addition to increasing the size of the share screen video stream window 430, the aspect ratio is altered. For example, a previous aspect ratio of about 4:3 may be updated to about 16:9. However, it should be understood that these aspect ratios are only a few examples and that many other aspect ratios are also contemplated. In some embodiments, the share screen video window 430 comprises an exact or similar representation of the first user's screen or at least a portion of the first user's screen from the first user's device. For example, in some embodiments, the share screen video window 430 may be generated based on a specific window of the first user's display. For example, the first user may use the share screen video window 430 to share a slideshow presentation such that the presentation window is visible to viewers within the video communication session, as shown. In some embodiments, the share screen video window 430 further comprises the user's cursor 432 or a similar pointer indicator.

Figure 4C:
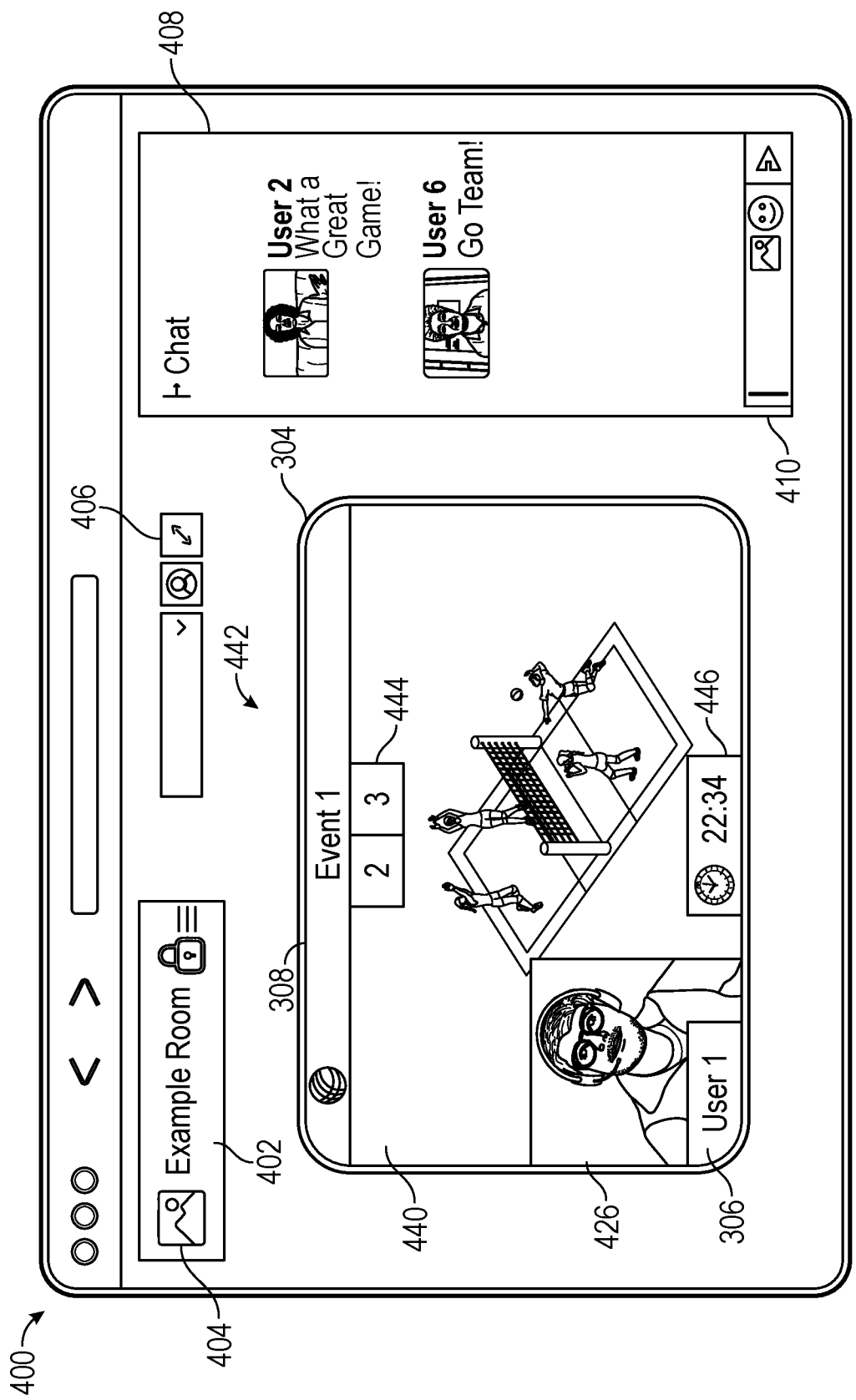

Turning now to FIG. 4C, the user interface 400 is depicted relating to some embodiments of the invention. In some embodiments, the user interface 400 comprises an event video stream window 440, as shown. Here, the event video stream window 440 may be associated with a streamed event. For example, in some embodiments, the event video stream window 440 may be associated with a sporting event, gaming event, or some other streamed event. Accordingly, the event video stream window 440 may include a video stream associated with said event. In some embodiments, users may use the event video stream window 440 to show footage of the event while meeting participants of the video communication session discuss or commentate over the event footage.

In some embodiments, an event overlay 442 including any number of dynamic overlay elements may be rendered over the event video stream window 440, as shown. In some such embodiments, the event overlay 442 may include one or more event-related dynamic overlay elements. For example, in some embodiments, the event overlay 442 for the event video stream window 440 may include a dynamically updated score board element 444 and a dynamically updated timer element 446 associated with the event. In some such embodiments, the score board element 444 and timer element 446 may be periodically updated based on event-related information from the event. For example, in some embodiments, the score board element 444 may be updated based on received game score data of the associated event. It should be understood that the score board element 444 and the timer element 446 are just a few examples of dynamic overlay elements and that further overlay elements are contemplated which may be configured to include dynamic values which are updated during the video communication session. In some embodiments, the event overlay 442 further comprises one or more of the dynamic overlay elements described above, such as, the banner 308. For example, the banner 308 may be included showing a title for the event. In some embodiments, the changing length of text in an element such as score board element 444 or the timer element 446 may itself be a reflow trigger that causes the dynamic elements to update.

In some embodiments, a video stream window 426 may be included within the user interface 400. For example, in some embodiments, the video stream window 426 may be rendered over the event video stream window 440, as shown. Accordingly, a user may utilize the video stream window 426 to commentate the event, such that viewers see both the user's video stream and the event video stream window 440. Additionally, in some embodiments, video stream window 426 may be rendered separately from the event video stream window 440, such as, for example, adjacent to the event video stream window 440 (not shown).

Figure 5:
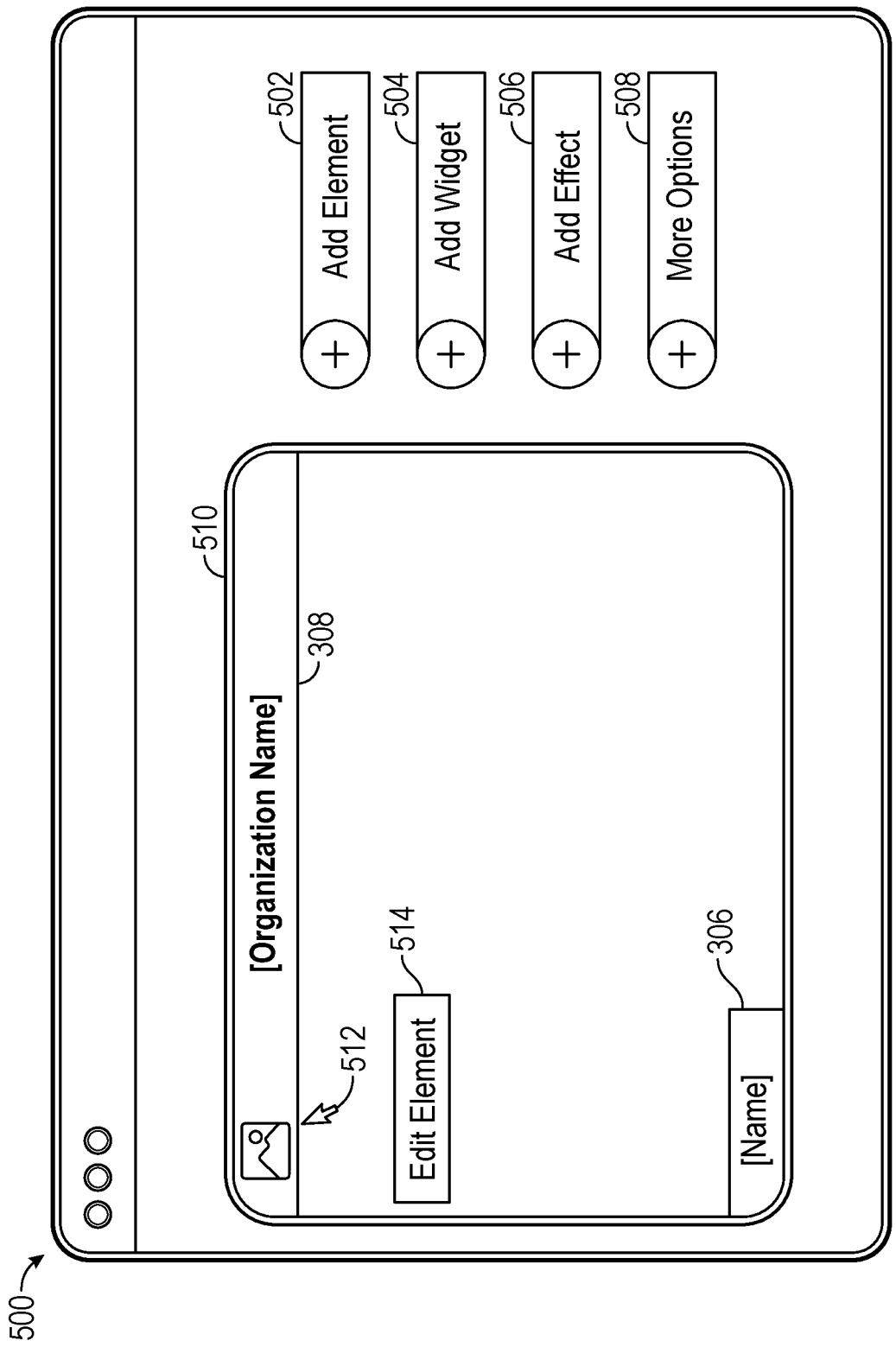
FIG. 5 depicts an exemplary builder user interface relating to some embodiments of the invention.

Turning now to FIG. 5, an exemplary builder user interface 500 is depicted relating to some embodiments of the invention. In some such embodiments, the builder user interface 500 may be associated with the builder tool 224, as shown in FIG. 2A. Accordingly, the builder user interface 500 may be rendered for display on a user device of the builder user 222. As such, the builder user 222 may use the builder user interface 500 to generate one or more overlay templates. In some embodiments, the builder user interface 500 comprises an add element actuator 502, as shown, configured to generate an overlay element for a custom user-defined overlay template. For example, the builder user 222 may select the add element actuator 502 to add one of the dynamic overlay elements described herein, such as, the name tag 306.

In some embodiments, the builder user interface 500 comprises an add widget actuator 504 configured to add a configurable widget overlay element to a custom overlay template. In some embodiments, configurable widget overlay elements may include complex overlay elements which may be generated and updated based on external information. For example, a user may configure a custom widget overlay element for rendering an automatically updated timer for an associated event, similar to the timer element 446 of FIG. 4C described above. Further, custom widgets are contemplated including a poll widget, for example, configured to receive polling data during a video communication session and display polling results within an automatically updated overlay element of the overlay 300. In some embodiments, the builder user interface 500 further comprises an add effect actuator 506. The add effect actuator 506 may be configured to add one or more image effects to the overlay template. In some such embodiments, the one or more image effects may comprise various animation effects which may be applied to the dynamic overlay elements of the overlay 300 during a video communication session.

In some embodiments, the builder user interface 500 further comprises a more options actuator 508 which may be configured to present a set of additional options to a user in response to the user selecting the more options actuator 508. In some embodiments, the builder user interface 500 further comprises an example overlay 510 showing an example of the custom overlay. Accordingly, the example overlay 510 may include a depiction of the dynamic overlay elements such as the name tag 306 and the banner 308, as shown. In some embodiments, a cursor 512 of a user, such as the builder user 222, may be included on the builder user interface 500 for allowing the user to select various elements within the example overlay 510. Accordingly, in some embodiments, an edit element actuator 514 may be included allowing the user to edit existing dynamic overlay elements within the example overlay 510. It should be understood that in some embodiments, the builder user interface 500 may be generated for display on a mobile device such as a smartphone or another touch screen device. Accordingly, embodiments are contemplated in which the cursor 512 is replaced with touch screen functionality allowing the user to select the various actuators described with respect to the builder user interface 500.

In some embodiments, the example overlay 510 may be displayed in a similar fashion as described with respect to the simulated web browser. For example, the example overlay may be rendered using HTML code such that the example overlay 510 resembles the eventual custom overlay created with the builder user interface 500.

In some embodiments, the overlay elements and widgets generated using the builder interface 500 may be configured to include dynamic values which are updated during a video communication session. For example, in some embodiments, a user may configure the overlay elements to be updated based on one or more external variables. Accordingly, during the video communication session the overlay elements may be periodically updated based on the one or more external variables. In some embodiments, the external variables may be monitored through a communicative connection to a server. Additionally, in some embodiments, said external variables may be retrieved from a data store, data table, spreadsheet, or accessed through a web page. For example, embodiments are contemplated in which a hyperlink may be referenced within an overlay element such that a dynamic value of the overlay element is updated with respect to a web resource associated with the hyperlink. In some such embodiments, said dynamic values may be configurable by the user such that the user can select the one or more external variables.

In some embodiments, the custom user-defined overlay template may be stored and converted into an HTML format such that the overlay template may be used to generate the overlay 300, as described above, during a video communication session. In some embodiments, the overlay template may be stored as a suitable vector graphics format file such as a LOTTIE file or other suitable graphics format. In some embodiments, the overlay template file may be converted to HTML first and stored as an overlay template file comprising HTML code for rendering the overlay 300 over a video stream during a video communication session. In some embodiments, the overlay template may be generated and/or stored using a native file format and may be eventually converted into an HTML format.

In some embodiments, certain operations within the builder user interface 400 may be restricted for at least one user. For example, in some embodiments, the builder user interface 400 may only allow a limited subset of operations such that users do not generate overlay elements and effects which interfere with the eventual rendering of the overlay. For example, in some embodiments, it may be desirable to restrict a file size of images and animations within the overlay such that substantially large image files do not hinder the rendering of the overlay during the video communication session. Further, widgets and operations which would require a substantial amount of processing and memory resources during the video communication session may be restricted. Said limiting of operations within the builder interface 500 may further reduce errors and bugs from occurring during the video communication sessions. Further, embodiments are contemplated in which only certain users with express access are able to perform said restricted operations within the builder interface 500. For example, in some embodiments, operations may be allowed for users with an approved developer status while operations are restricted for users with a standard user status. Further still, embodiments are contemplated in which operations of the builder user interface 500 are not restricted.

Figure 6:
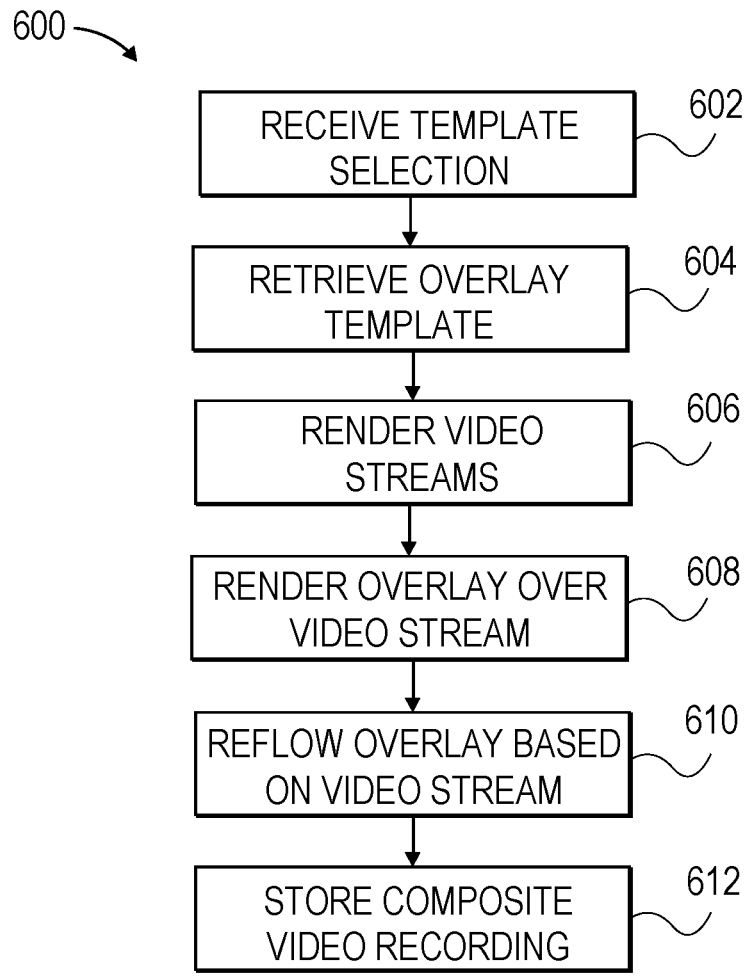
FIG. 6 depicts an exemplary method relating to some embodiments of the invention.

Turning now to FIG. 6, an exemplary method 600 is depicted relating to some embodiments of the invention. In some embodiments, method 600 is a method for performing dynamic video rendering. For example, method 600 may be used to generate a video stream such as video stream window 426 along with a dynamic overlay 300 rendered over the video stream during a video communication session. In some embodiments, method 600 may be performed using at least one processor. Further, in some embodiments, processing may be split between multiple processors such that a first processor executes a first portion of steps while a second processor executes a second portion of steps.

At step 602, a selection of an overlay template is received. In some embodiments, the selection may be a user selection, for example, from a user operating a user device. In some embodiments, the overlay template is selected from a plurality of overlay templates which may include any number of preconfigured overlay templates and custom overlay templates. For example, in some embodiments, users may create new custom overlay templates using the builder user interface 500.

At step 604, the selected overlay template is retrieved from a data store such as, for example, the overlay template repository 226, as shown in FIG. 2A. In some embodiments, the overlay template comprises HTML code for generating the overlay 300. In some such embodiments, the overlay 300 may be a substantially transparent dynamically overlay comprising one or more non-transparent dynamic overlay elements, such as described with respect to FIGS. 3A-B above. For example, in some embodiments, the overlay 300 comprises the transparent portion 302 which allows a video stream to be viewed through the overlay 300.

At step 606, one or more video streams are rendered using a simulated browser during a video communication session. In some such embodiments, the video streams are rendered as part of the user interface 400. Here, the video streams may be rendered to a web page by the simulated browser, for example, using HTML code, such that users can access said web page to view the video streams. In some embodiments, a single video stream may be rendered. Alternatively, in some embodiments, a plurality of video streams are rendered. In some embodiments, rendering the video streams to a web page with HTML allows the video streams to be easily manipulated, moved, and changed during the video communication session. For example, users may be able to resize and/or reposition the video streams. Additionally, in some embodiments, the video streams may be automatically resized and/or repositioned during the video communication session, for example, based on the number of video stream windows 426.

At step 608, a dynamic overlay is rendered over a corresponding one of the video streams. In some embodiments, the dynamic overlay may comprise the overlay 300 described with respect to FIGS. 3A-B above. In some embodiments, the dynamic overlay may be rendered similarly to the video streams using the simulated browser. In some embodiments, the dynamic overlay is rendered on a subsequent layer of the user interface 400 such that the dynamic overlay appears in front of the video stream, which is rendered to a lower layer of the user interface 400. In some embodiments, the dynamic overlay comprises any number of the dynamic overlay elements described herein, as well as other dynamic overlay elements not explicitly referred to herein.

At step 610, the dynamic overlay is automatically reflowed responsive to a change in at least one video stream during the video communication session. In some embodiments, the dynamic overlay is updated on the fly and in real time during the video communication session such that the dynamic overlay is automatically updated to match a changing video stream. For example, in some embodiments, the dynamic overlay is reflowed in response to a repositioning, resizing, or rescaling of the video stream. Accordingly, the dynamic overlay may be reflowed based on an updated scale and position of the corresponding video stream. For example, if the scale of the video stream is increased to an updated scale and the video stream is repositioned to an updated position, the dynamic overlay will automatically be reflowed to match the updated scale and updated position such that the dynamic overlay is rendered to the same position and matches the size and scaling of the video stream. In some embodiments, reflowing the dynamic overlay further comprises reflowing one or more of the dynamic overlay elements. For example, in some embodiments, a text formatting of the various text strings in the dynamic overlay elements may be updated based on changes in the video stream.

In one example, the width of the video stream may be reduced. In response to the width reduction of the video stream, text within the name tag 306 may be automatically wrapped to a new line, as shown in FIG. 3B. Accordingly, the dynamic overlay elements may be adaptive such that they change with respect to the corresponding video stream over which the dynamic overlay is rendered. Further, embodiments are contemplated in which the change to the at least one video stream may comprise tilting the video stream window. Accordingly, in some such embodiments, the dynamic overlay may be reflowed to reflect the tilted video stream window. Further still, embodiments are contemplated in which text may be collapsed based on a change in the overlay size or scale. For example, if a text string of the name tag 306 is too big to fit within the name tag space, the text string may be collapsed such that only a portion of the text string is rendered in the name tag 306.

At step 612, a composite video recording associated with the video communication session may be stored. For example, the composite video recording may be stored in a data store after the video communication session has ended. In some embodiments, the composite video recording comprises the plurality of video streams and the dynamic overlay. It should be understood that, in some embodiments, step 612 may be optional. For example, in some embodiments, the composite video recording may not be stored.

It should be understood that, in some embodiments, any number of the steps described above may be repeated. Further, embodiments are contemplated in which certain steps may be omitted or performed out of order or simultaneously. For example, in some embodiments, steps 606 and 608 are performed simultaneously, such that the video streams and the overlay are rendered at the same time.

In one example use case of the invention, an additional user joins an existing video communication session with a plurality of users. After the additional user joins, a new video stream window 426 is generated for the additional user and rendered on the user interface 400. Accordingly, the video stream windows of the plurality of users are repositioned and rescaled in response to the additional user joining. Accordingly, any overlays corresponding to the video stream windows will be reflowed to update the overlays with respect to the updated scale and position of the video streams. For example, when the additional user joins, the remaining video streams may be reduced in size and moved apart to create space on the user interface 400 for the new video stream window of the additional user. Embodiments are contemplated in which various other factors may initiate changes in the video streams causing the dynamic overlay to be reflowed. For example, an existing user leaving a video communication session, a user sharing their screen, a user manually adjusting at least one of the video stream windows 426, or other changes to the video streams not explicitly described herein.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer executable instructions that, when executed by at least one processor, perform a method for dynamic video rendering, the method comprising:
   receiving a selection of an overlay template from a plurality of overlay templates;
   retrieving the overlay template from an overlay template repository, the overlay template including hypertext markup language (HTML) code for generating a substantially transparent dynamic overlay comprising one or more non-transparent dynamic overlay elements;
   rendering a plurality of video streams using a simulated browser during a video communication session;
   rendering the substantially transparent dynamic overlay over a video stream of the plurality of video streams using the simulated browser during the video communication session;
   responsive to a change in at least one of the plurality of video streams during the video communication session, automatically reflowing the substantially transparent dynamic overlay based on an updated scale and an updated position of the video stream,
   wherein the change in the at least one of the plurality of video streams comprises changing an aspect ratio of the video stream and is associated with a user joining or leaving the video communication session;
   storing a composite video recording comprising the plurality of video streams and the substantially transparent dynamic overlay,
   wherein the one or more non-transparent dynamic overlay elements comprise a dynamic name tag; and
   updating a format of the dynamic name tag including a username of at least one user rendered over the video stream based on the change in the at least one of the plurality of video streams.

2. The one or more non-transitory computer-readable media of claim 1, wherein the change is further associated with a user selection from the user within the video communication session.

3. The one or more non-transitory computer-readable media of claim 1, wherein the one or more non-transparent dynamic overlay elements comprises at least one of: an adaptive name tag, a live comment, custom text, or integration output display.

4. The one or more non-transitory computer-readable media of claim 1, further comprising:
   generating one or more hypertext markup language (HTML) custom overlay templates based on one or more user selections.

5. The one or more non-transitory computer-readable media of claim 4, further comprising:
   receiving an additional selection of an additional overlay template from the plurality of overlay templates;
   retrieving the additional overlay template from the overlay template repository, the additional overlay template including hypertext markup language (HTML) for generating an additional substantially transparent dynamic overlay comprising one or more additional non-transparent dynamic overlay elements;
   rendering the additional substantially transparent dynamic overlay over an additional video stream of the plurality of video streams using the simulated browser during the video communication session; and responsive to the change in at least one of the plurality of video streams, automatically reflowing the additional substantially transparent dynamic overlay based on an additional updated scale and an additional updated position of the additional video stream.

6. The one or more non-transitory computer-readable media of claim 1, wherein the method further comprises:
responsive to a subsequent change in at least one of the plurality of video streams during the video communication session, automatically reflowing the substantially transparent dynamic overlay based on a subsequent updated scale and a subsequent updated position of the video stream.

7. The one or more non-transitory computer-readable media of claim 6, wherein the subsequent change in the at least one of the plurality of video streams is associated with at least one further user joining or leaving the video communication session.

8. The one or more non-transitory computer-readable media of claim 1, further comprising:
updating a second format of a second dynamic name tag including a second username of a second user rendered over a second video stream based on the change in the at least one of the plurality of video streams.

9. A method for dynamic video rendering, the method comprising:
receiving a selection of an overlay template from a plurality of overlay templates;
retrieving the overlay template from an overlay template repository, the overlay template including hypertext markup language (HTML) code for generating a substantially transparent dynamic overlay comprising one or more non-transparent dynamic overlay elements;
rendering a plurality of video streams using a simulated browser during a video communication session;
rendering the substantially transparent dynamic overlay over a video stream of the plurality of video streams using the simulated browser during the video communication session;
responsive to a change in at least one of the plurality of video streams during the video communication session, automatically reflowing the substantially transparent dynamic overlay based on an updated scale and an updated position of the video stream;
responsive to a subsequent change in at least one of the plurality of video streams during the video communication session, automatically reflowing the substantially transparent dynamic overlay based on a subsequent updated scale and a subsequent updated position of the video stream,
wherein the subsequent change in the at least one of the plurality of video streams is associated with a user joining or leaving the video communication session,
wherein the one or more non-transparent dynamic overlay elements comprise a dynamic name tag; and
updating a format of the dynamic name tag including a username of at least one user rendered over the video stream based on the change in the at least one of the plurality of video streams.

10. The method of claim 9, further comprising:
storing a composite video recording comprising the plurality of video streams and the substantially transparent dynamic overlay.

11. The method of claim 9, further comprising:
receiving one or more user selections within a builder tool user interface,
wherein the builder tool user interface allows a limited subset of operations for custom creating overlay templates while restricting one or more other operations; and
generating a custom user-defined overlay template file in a native file format based on the one or more user selections.

12. The method of claim 11, further comprising:
converting the custom user-defined overlay template file from the native file format into an HTML format to produce a custom user-defined overlay template; and
storing the custom user-defined overlay template in the overlay template repository.

13. The method of claim 9, wherein the one or more non-transparent dynamic overlay elements comprise a plurality of animated images to be displayed over the video stream during the video communication session.

14. The method of claim 9, wherein the change in the at least one of the plurality of video streams comprises changing an aspect ratio of the video stream.

15. The method of claim 9, further comprising:
suppressing display of a second video stream of the plurality of video streams during the video communication session based on a share screen operation.

16. A system for dynamic video rendering comprising:
at least one data store; and
at least one processor programmed to perform a method comprising:
receiving a selection of an overlay template from a plurality of overlay templates;
retrieving the overlay template from an overlay template repository, the overlay template including hypertext markup language (HTML) code for generating a substantially transparent dynamic overlay comprising one or more non-transparent dynamic overlay elements;
rendering a plurality of video streams using a simulated browser during a video communication session;
rendering a first dynamic overlay over a first video stream of the plurality of video streams corresponding to a first user using the simulated browser during the video communication session;
rendering a second dynamic overlay over a second video stream of the plurality of video streams corresponding to a second user using the simulated browser during the video communication session;
responsive to a change in at least one of the plurality of video streams during the video communication session:
automatically reflowing the first dynamic overlay based on a first updated scale and a first updated position of the first video stream; and
automatically reflowing the second dynamic overlay based on a second updated scale and a second updated position of the second video stream,
wherein the change in the at least one of the plurality of video streams is associated with a share screen operation by the first user;
increasing a scale of the first video stream based on the share screen operation,
wherein automatically reflowing the first dynamic overlay comprises updating the first dynamic overlay based at least in part on the share screen operation,
wherein the one or more non-transparent dynamic overlay elements comprise a dynamic name tag;
updating a first format of a first dynamic name tag including a first username of the first user rendered over the first video stream based on the change in the at least one of the plurality of video streams; and updating a second format of a second dynamic name tag including a second username of the second user rendered over the second video stream based on the change in the at least one of the plurality of video streams.

17. The system of claim 16, further comprising:

responsive to a subsequent change in at least one of the plurality of video streams during the video communication session:

automatically reflowing the first dynamic overlay based on a subsequent first updated scale and a subsequent first updated position of the first video stream; and automatically reflowing the second dynamic overlay based on a subsequent second updated scale and a subsequent second updated position of the second video stream.

18. The system of claim 16, wherein the one or more non-transparent dynamic overlay elements comprise a dynamic value configured to update during the video communication session.

19. The system of claim 16, the method further comprising:

suppressing display of the second video stream and the second dynamic overlay during the video communication session based on the share screen operation.

20. The system of claim 16, wherein the change in the at least one of the plurality of video streams is associated with a user joining or leaving the video communication session.

\* \* \* \* \*